(12) United States Patent
Zhou et al.

(10) Patent No.: US 11,239,468 B2
(45) Date of Patent: Feb. 1, 2022

(54) SECONDARY BATTERY AND ELECTRODE PLATE THEREOF HAVING INSULATING LAYER

(71) Applicant: Contemporary Amperex Technology Co., Limited, Ningde (CN)

(72) Inventors: Yaru Zhou, Ningde (CN); Qingrui Xue, Ningde (CN); Zige Zhang, Ningde (CN); Miao Jiang, Ningde (CN); Jing Li, Ningde (CN); Wei Li, Ningde (CN); Long Wang, Ningde (CN)

(73) Assignee: Contemporary Amperex Technology Co., Limited

( * ) Notice: Subject to any disclaimer, the term of this patent is extended or adjusted under 35 U.S.C. 154(b) by 238 days.

(21) Appl. No.: 16/375,531

(22) Filed: Apr. 4, 2019

(65) Prior Publication Data
US 2020/0006776 A1    Jan. 2, 2020

(30) Foreign Application Priority Data
Jun. 29, 2018    (CN) .......................... 201821018434.4

(51) Int. Cl.
| | |
|---|---|
| *H01M 4/66* | (2006.01) |
| *H01M 4/70* | (2006.01) |
| *H01M 50/531* | (2021.01) |
| *H01M 4/02* | (2006.01) |

(52) U.S. Cl.
CPC ............. *H01M 4/667* (2013.01); *H01M 4/70* (2013.01); *H01M 50/531* (2021.01); *H01M 2004/021* (2013.01)

(58) Field of Classification Search
CPC ....... H01M 4/667; H01M 4/70; H01M 50/531
See application file for complete search history.

(56) References Cited

U.S. PATENT DOCUMENTS

| | | | |
|---|---|---|---|
| 2006/0073382 A1 | 4/2006 | Urano | |
| 2007/0048613 A1 | 3/2007 | Yanagida | |
| 2009/0017376 A1 | 1/2009 | Yamamura | |
| 2015/0171462 A1* | 6/2015 | Hong ................ | H01M 10/0431 429/1 |
| 2017/0047575 A1* | 2/2017 | Tsuji ....................... | H01M 4/04 |

* cited by examiner

*Primary Examiner* — Jimmy Vo
(74) *Attorney, Agent, or Firm* — Forge IP, PLLC

(57) ABSTRACT

A secondary battery and an electrode plate are provided. The electrode plate includes a current collector, an active material layer, a conductive structure, and a first protective layer. The current collector includes an insulating layer and a conductive layer disposed on the insulating layer. The conductive layer includes a main body portion and a protrusion portion. A surface of the main body portion facing away from the insulating layer is covered by the active material layer, while a surface of the protrusion portion facing away from the insulating layer is uncovered by the active material layer. The conductive structure is welded to the protrusion portion and thus a welded zone is formed. The first protective layer has elasticity, and is disposed on a side of the protrusion portion facing away from the insulating layer and is located between the welded zone and the active material layer.

17 Claims, 10 Drawing Sheets

SECONDARY BATTERY AND ELECTRODE PLATE THEREOF HAVING INSULATING LAYER

CROSS-REFERENCE TO RELATED APPLICATIONS

The present application claims priority to Chinese Patent Application No. 201821018434.4, filed on Jun. 29, 2018, the content of which is incorporated herein by reference in its entirety.

TECHNICAL FIELD

The present disclosure relates to the technical field of battery, and in particular, relates to a secondary battery and an electrode plate of the secondary battery.

BACKGROUND

An electrode plate of a secondary battery generally includes a current collector and an active material layer coated on a surface of the current collector. In order to improve safety performance of the secondary battery, an electrode plate 1 can adopt a current collector 11 having a multilayer structure. Referring to FIGS. 1 and 2, the current collector 11 includes an insulating layer 111 and conductive layers 112 provided on both surfaces of the insulating layer 111, and an active material layer 12 is coated on a surface of each conductive layer 112. The conductive layer 112 includes a main body portion 1121 covered by the active material layer 12 and a protrusion portion 1122 protruding from the active material layer 12. The protrusion portion 1122 together with a part of the insulation layer 111 corresponding to the protrusion portion 1122 constitutes a current guiding portion P. The insulating layer 111 insulates the conductive layers 112 disposed on its both sides, so that current cannot flow between these two conductive layers 112. Therefore, the current guiding portion P has a poor current passing performance. In order to improve the current passing performance, a conductive structure 13 is usually welded on the conductive layers 112 and thus a welded zone W is formed between the conductive structure 13 and the conductive layer 112, so that the current on each conductive layer 112 converges on the conductive structure 13. Connecting the current guiding portion P and the conductive structure 13 together would lead to a large length such that the current guiding portion P and the conductive structure 13 usually have to be bent for saving space. In addition, since the welded zone W is unlikely to be bent due to its great rigidity, the bending has to occur at a position lower or higher than the welded zone W. However, referring to FIG. 1, when the bending occurs at the position lower than the welded zone W, the protrusion portion 1122 can be easily bent to break due to a small thickness thereof, thereby affecting the current passing performance. Referring to FIG. 2, when the bending occurs at the position higher than the welded zone W, the welded zone W will still occupy a large space at height, thereby affecting an energy density of the secondary battery.

SUMMARY

In view of the problems in the prior art, the present disclosure aims to provide a secondary battery and an electrode plate thereof, aiming to enhance the energy density as well as improve safety performance and the current passing performance.

According to a first aspect of the present disclosure, an electrode plate of a secondary battery is provided. The electrode plate includes: a current collector; an active material layer; a conductive structure; and a first protective layer. The current collector includes an insulating layer and a conductive layer disposed on the insulating layer. The conductive layer includes a main body portion and a protrusion portion connected to the main body portion. A surface of the main body portion facing away from the insulating layer is covered by the active material layer, and a surface of the protrusion portion facing away from the insulating layer is uncovered by the active material layer. The conductive structure is welded to the protrusion portion and thus a welded zone is formed. The first protective layer has elasticity, and the first protective layer is disposed on a side of the protrusion portion facing away from the insulating layer and is located between the welded zone and the active material layer.

In an embodiment, in a thickness direction of the electrode plate, a surface of the first protective layer facing away from the protrusion portion is lower than a surface of the active material layer facing away from the main body portion.

In an embodiment, in a thickness direction of the electrode plate, a surface of the first protective layer facing away from the protrusion portion is closer to the insulating layer than a surface of the active material layer facing away from the main body portion.

In an embodiment, the first protective layer is connected to an end of the active material layer close to the conductive structure and an end of the conductive structure close to the active material layer.

In an embodiment, the first protective layer is in contact with the protrusion portion, and the first protective layer has a smaller modulus of elasticity than the protrusion portion.

In an embodiment, the electrode plate further includes a second protective layer disposed between the first protective layer and the active material layer. The second protective layer has a greater hardness than the conductive layer.

In an embodiment, the second protective layer is connected to the active material layer, and the first protective layer is connected to an end of the second protective layer away from the active material layer and an end of the conductive structure close to the active material layer.

In an embodiment, the electrode plate further includes a third protective layer covering a surface of the welded zone facing away from the protrusion portion. The third protective layer is connect to the first protective layer, and is made of a material same as the first protective layer.

In an embodiment, the first protective layer extends to edges of both sides of the protrusion portion in a length direction, and the first protective layer has a dimension in a range of 0.1 mm to 4 mm along a height direction.

According to a second aspect of the present disclosure, a secondary battery is provided. The secondary battery includes an electrode assembly. The electrode assembly includes the electrode plate according to the first aspect.

In an embodiment, a portion of the insulating layer corresponding to the protrusion portion and the protrusion portion together form a current guiding portion. The electrode plate includes a plurality of current guiding portions and a plurality of conductive structures. The plurality of current guiding portions is stacked, and every two adjacent current guiding portions of the plurality of current guiding portions have a conductive structure of the plurality of conductive structures therebetween. The first protective layer and the protrusion portion disposed opposite to the first protective layer are both bent with respect to the main body portion.

The technical solutions according to the present disclosure bring following benefits.

| Reference Signs in Drawings: | |
|---|---|
| 1 electrode plate | 1B negative electrode plate |
| 11 current collector | 2 case |
| 111 insulating layer | 3 top cover |
| 112 conductive layer | 4 electrode terminal |
| 1121 main body portion | 5 separator |
| 1122 protrusion portion | 6 connecting piece |
| 12 active material layer | P current guiding portion |
| 13 conductive structure | W welded zone |
| 14 first protective layer | X length direction |
| 15 second protective layer | Y thickness direction |
| 16 third protective layer | Z height direction |

DESCRIPTION OF EMBODIMENTS

Figure 1:
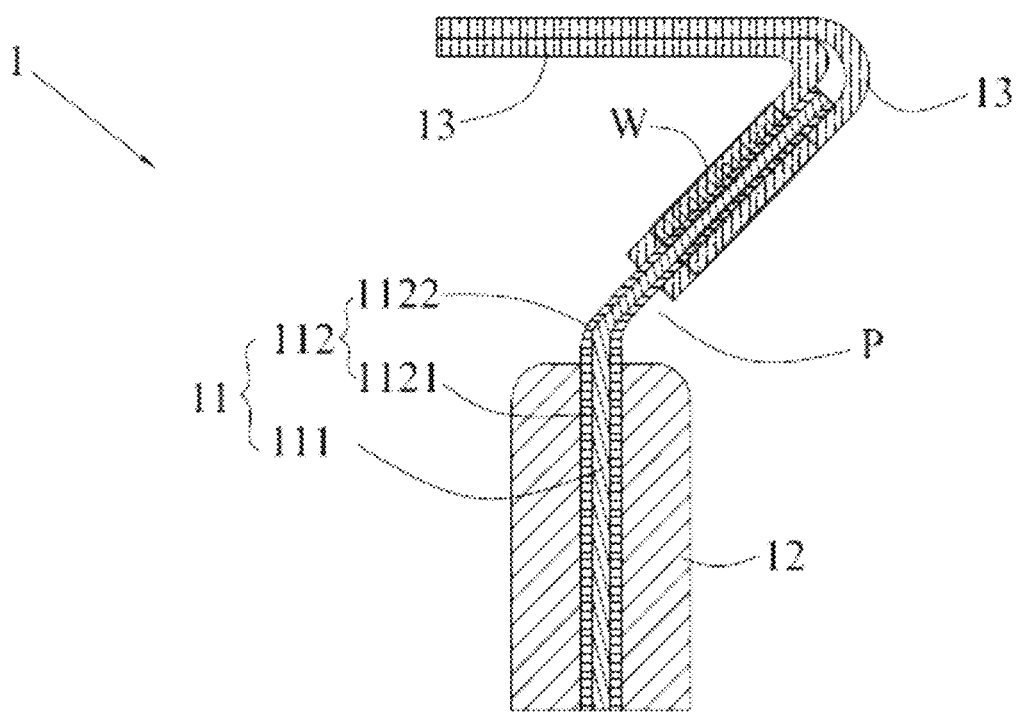
FIG. 1 is a schematic diagram of an electrode plate according to the related art.
Figure 2:
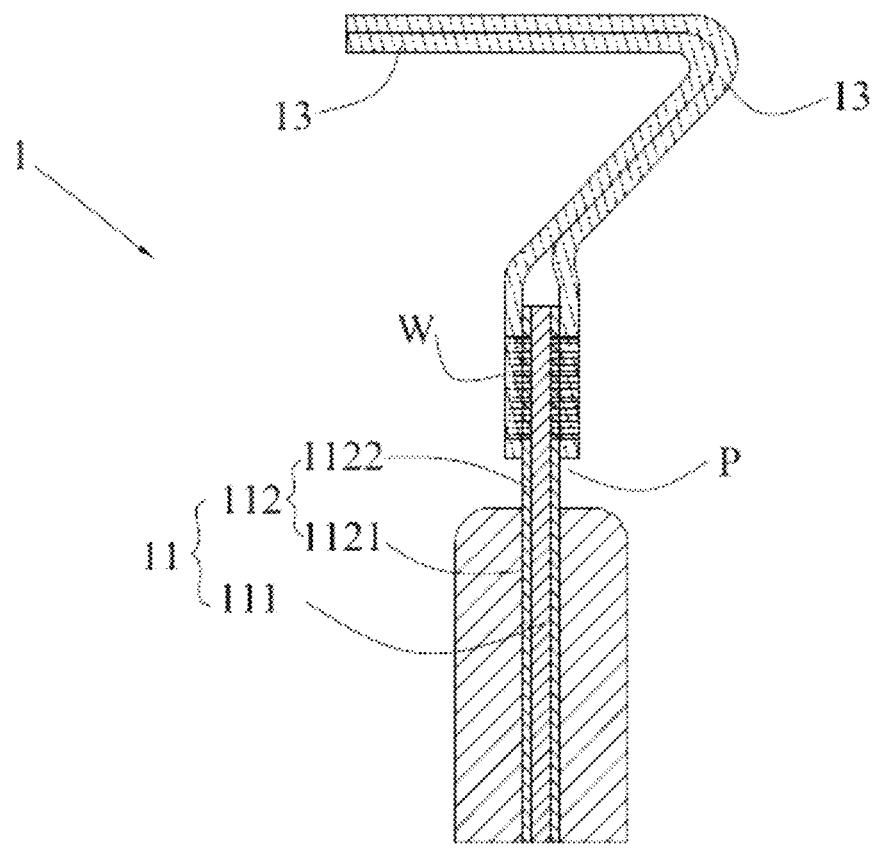
FIG. 2 is another schematic diagram of an electrode plate according to the related art.
Figure 3:
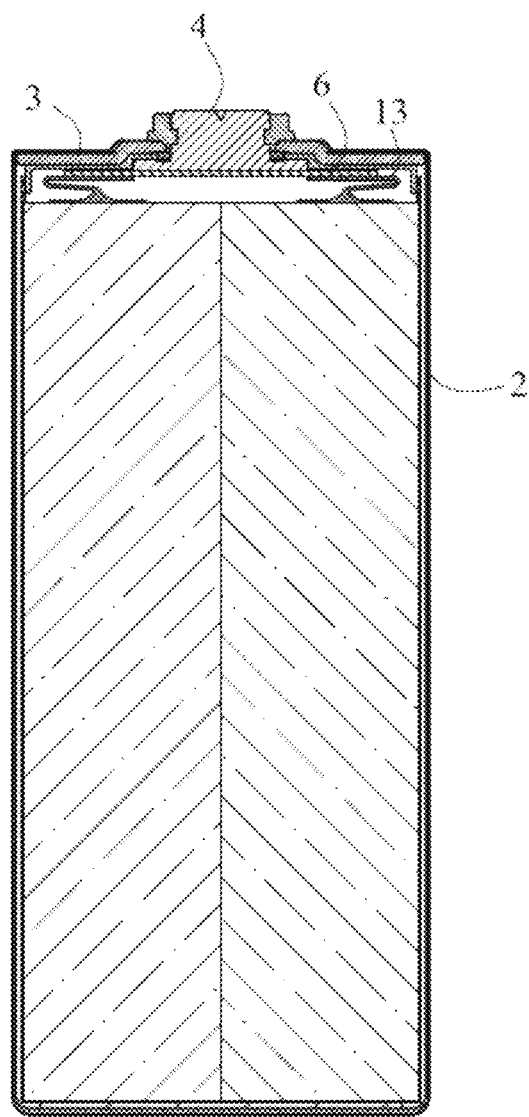
FIG. 3 is a schematic diagram of a secondary battery according to an embodiment of the present disclosure.

Referring to FIG. 3, a secondary battery includes an electrode assembly, a case 2, a top cover 3, an electrode terminal 4, and a connecting piece 6.

Figure 4:
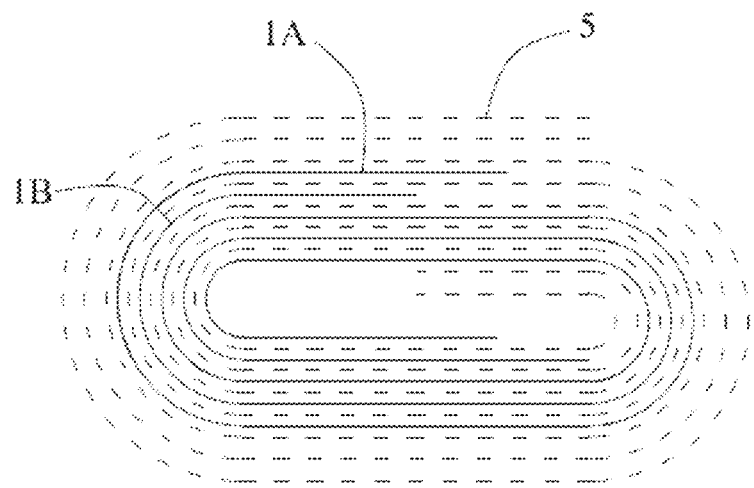
FIG. 4 is a schematic diagram of an electrode assembly of a secondary battery according to an embodiment of the present disclosure.

Referring to FIG. 4, an electrode assembly includes a positive electrode plate 1A, a negative electrode plate 1B and a separator 5. The separator is disposed between the positive electrode plate 1A and the negative electrode plate 1B. The positive electrode plate 1A, the separator 5 and the negative electrode plate 1B are stacked in sequence and wound to form a jelly roll-shaped electrode assembly.

The case 2 can have a hexahedral shape or other shape. A cavity is formed inside the case 2 to accommodate the electrode assembly and electrolyte. The case 2 has an opening at an end through which the electrode assembly can be placed into the cavity of the case 2. The case 2 can be made of a conductive metal material such as aluminum or aluminum alloy, or an insulating material such as plastic.

The top cover 3 is provided on the case 2 and covers the opening of the case 2 to seal the electrode assembly within the case 2. The electrode terminal 4 is disposed on the top cover 3. The electrode terminal 4 has an upper end protruding from an upper side of the top cover 3, and a lower end passing through the top cover 3 and extending into the case 2. The connecting piece 6 is disposed in the case 2 and is fixed to the electrode terminal 4. There are two electrode terminals 4 and two connecting piece 6. The positive electrode plate 1A is electrically connected to one of the two electrode terminals 4 via one of the two connecting pieces 6, and the negative electrode plate 1B is electrically connected to the other of the two electrode terminals 4 via the other of the two connecting pieces 6.

In the secondary battery according to the present disclosure, at least one of the positive electrode plate 1A and the negative electrode plate 1B is an electrode plate described below.

Referring to FIGS. 5-9, an electrode plate 1 includes a current collector 11, an active material layer 12, a conductive structure 13 and a first protective layer 14. The current collector 11 includes an insulating layer 111 and a conductive layer 112 disposed on the insulating layer 111. The conductive layer 112 includes a main body portion 1121 and a protrusion portion 1122 connected to the main body portion 1121. A surface of the main body portion 1121 facing away from the insulating layer 111 is covered by the active material layer 12, and a surface of the protrusion portion 1122 facing away from the insulating layer 111 is uncovered by the active material layer 12. The conductive structure 13 is welded to the protrusion portion 1122 and thus a welded zone W is formed. The first protective layer 14 has elasticity and is disposed on a side of the protrusion portion 1122 facing away from the insulating layer 111 and is located between the welded zone W and the active material layer 12.

Figure 5:
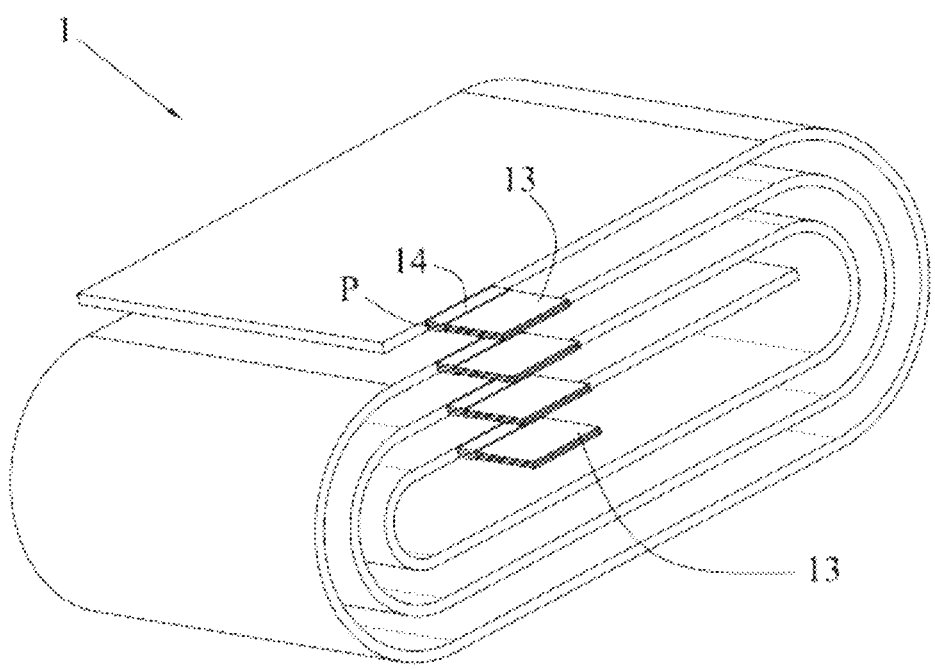
FIG. 5 is a schematic diagram of an electrode plate according to an embodiment of the present disclosure.
Figure 6:
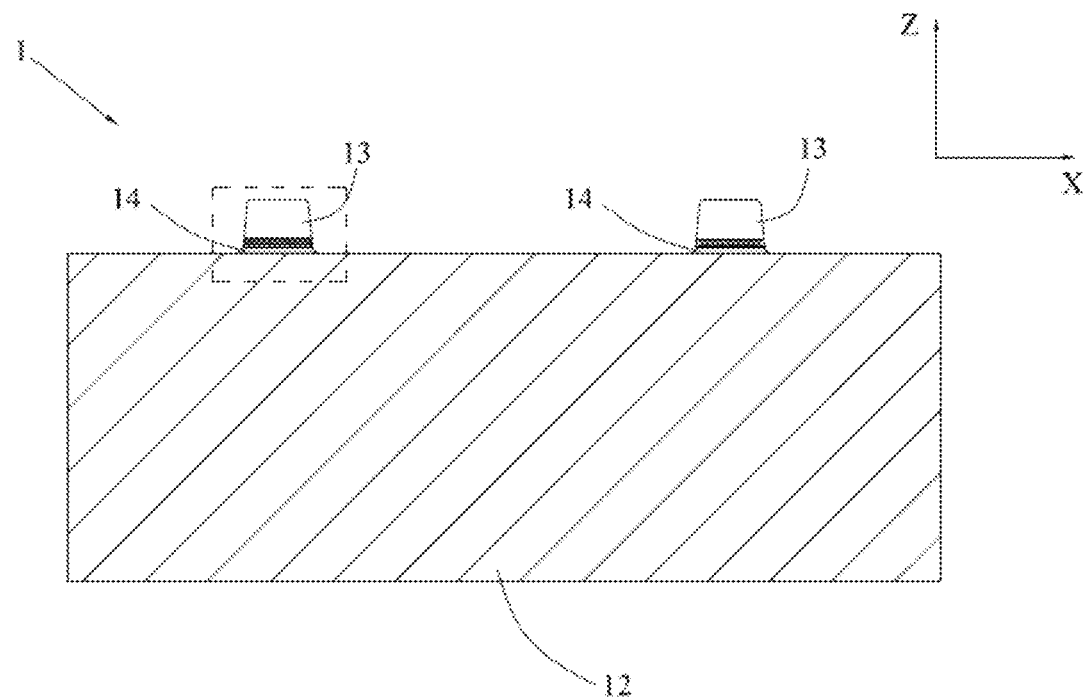
FIG. 6 is another schematic diagram of an electrode plate according to an embodiment of the present disclosure.

A portion of the insulating layer 111 corresponding to the protrusion portion 1122 together with the protrusion portion 1122 forms a current guiding portion P. Referring to FIG. 5, the electrode plate 1 can include a plurality of current guiding portions P and a plurality of conductive structures 13. Once the electrode plate 1 is formed by winding, the plurality of current guiding portions P of the electrode plate 1 is stacked, the plurality of conductive structures 13 is opposed to each other, and each two adjacent current guiding portions P have a conductive structure 13 therebetween. Referring to FIG. 3, the plurality of conductive structures 13 is welded to a connecting piece 6, so that current on the conductive layers 112 on both sides of the insulating layer 111 converges onto an electrode terminal 4.

Figure 10:
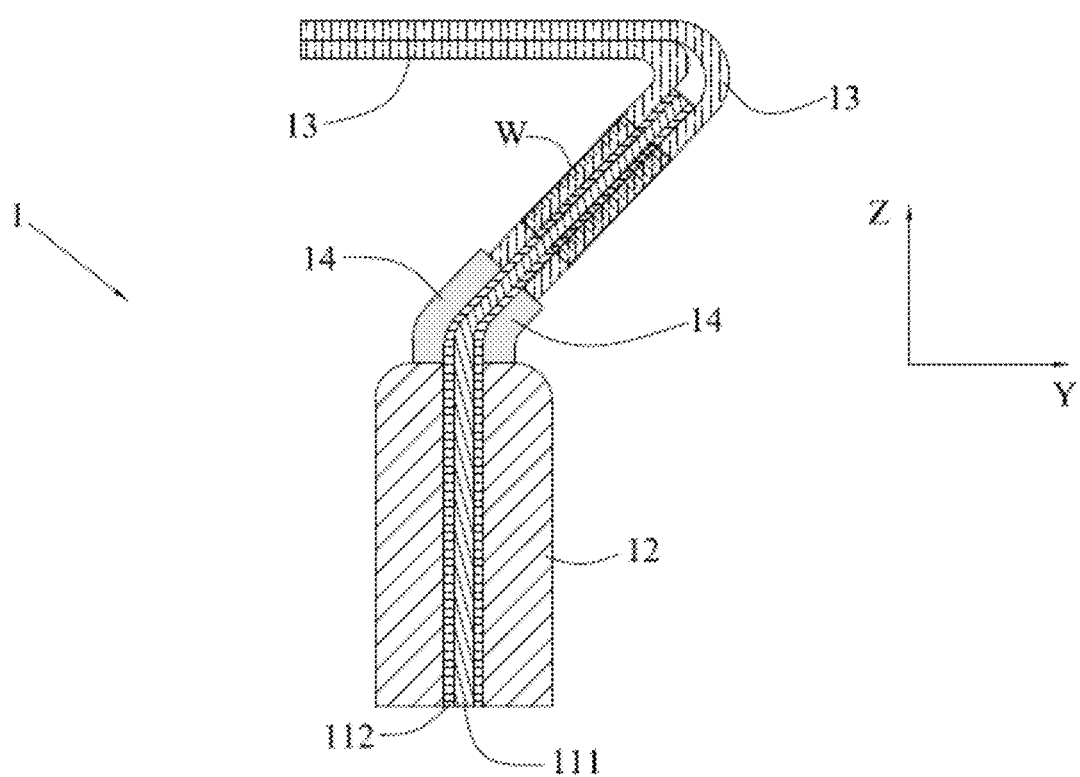
FIG. 10 is a schematic diagram of the electrode plate shown in FIG. 8 after the electrode plate is bent.

Since the current collector 11 of the electrode plate 1 is provided with the insulating layer 111, the thickness of the conductive layer 112 can be reduced. When a foreign matter pierces the electrode plate 1, due to the small thickness of the conductive layer 112, burr produced at a position of the conductive layer 112 where it is pierced by the foreign matter is too small to pierce a separator 5, thereby avoiding a short circuit and improving the safety performance. Referring to FIG. 10, the current guiding portion P can be bent at the region between the welded zone W and the active material layer 12, such that the space in height occupied by the current guiding portion P and the conductive structure 13 can be reduced, thereby enhancing the energy density of the secondary battery. The first protective layer 14 can protect the protrusion portion 1122 from being broken when being bent, and thus guarantee the current passing performance of the protrusion portion 1122. In the meantime, the first protective layer 14, due to its elasticity, can be bent together with the current guiding portion P, avoiding increasing the difficulty of bending the current guiding portion P.

After the current guiding portion P is bent, the first protective layer 14 and the protrusion portion 1122 disposed opposite to the first protective layer 14 are both bent with respect to the main body portion 1121. An end of the conductive structure 13 away from the active material layer 12 can extend beyond an end of the protrusion portion 1122 away from the main body portion 1121, and the exceeding portion can be bent to reduce the space occupied by the conductive structure 13 in a thickness direction Y.

The electrode plate 1 can be formed according to following steps of: 1. applying the active material layer 12 to a surface of the conductive layer 112 of the current collector 11; 2. rolling the active material layer 12 to compact the active material layer 12; 3. performing cutting to get the protrusion portion 1122 in a desired shape and the portion of insulating layer 111 corresponding to the protrusion portion 1122; 4. welding the conductive structure 13 to the protrusion portion 1122 and forming a welded zone W; and 5. applying a paste, such as an insulating glue, to the region of the protrusion portion 1122 between the welded zone W and the active material layer 12, thereby forming the first protective layer 14 having elasticity after curing of the paste.

The conductive layer 112 fully covers each surface of the insulating layer 111. The insulating layer 111 has a thickness of 1 μm to 20 μm. The conductive layer 112 has a thickness of 0.1 μm to 10 μm. The conductive structure 13 has a thickness of 6 μm to 15 μm. Since the conductive layer 112 is relatively thin, burr formed on the conductive layer 112 during the cutting process is too small to pierce the separator 5 having a thickness of dozens of micrometers, thereby avoiding a short circuit and improving safety performance.

Figure 8:
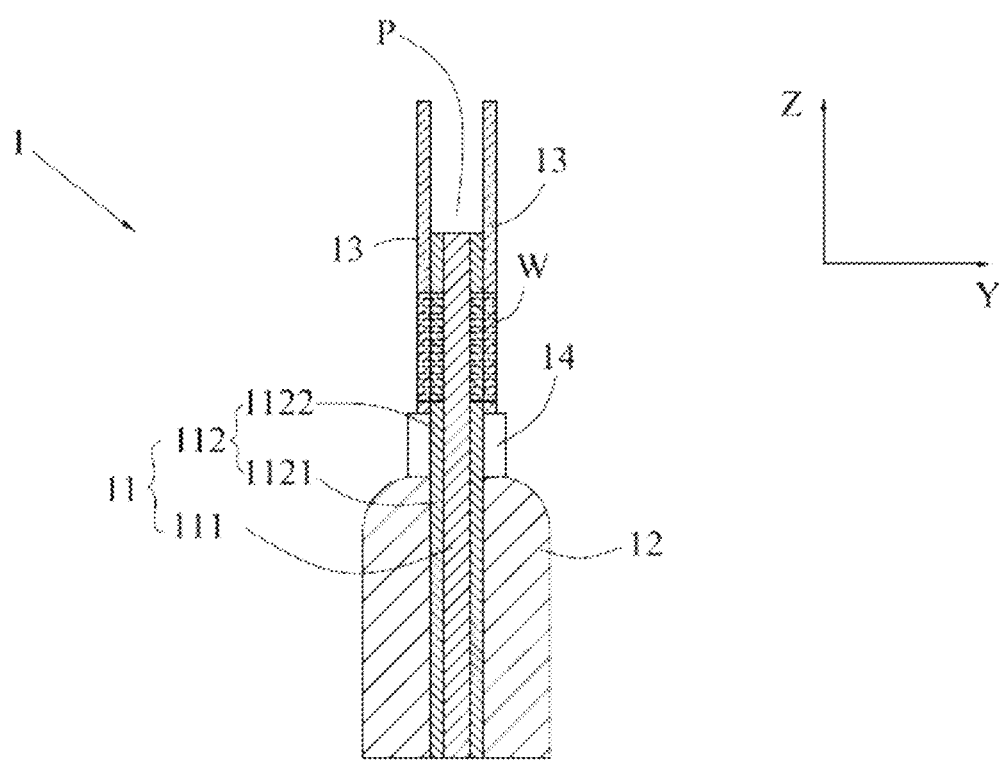
FIG. 8 is a section view along A-A shown in FIG. 7.
Figure 9:
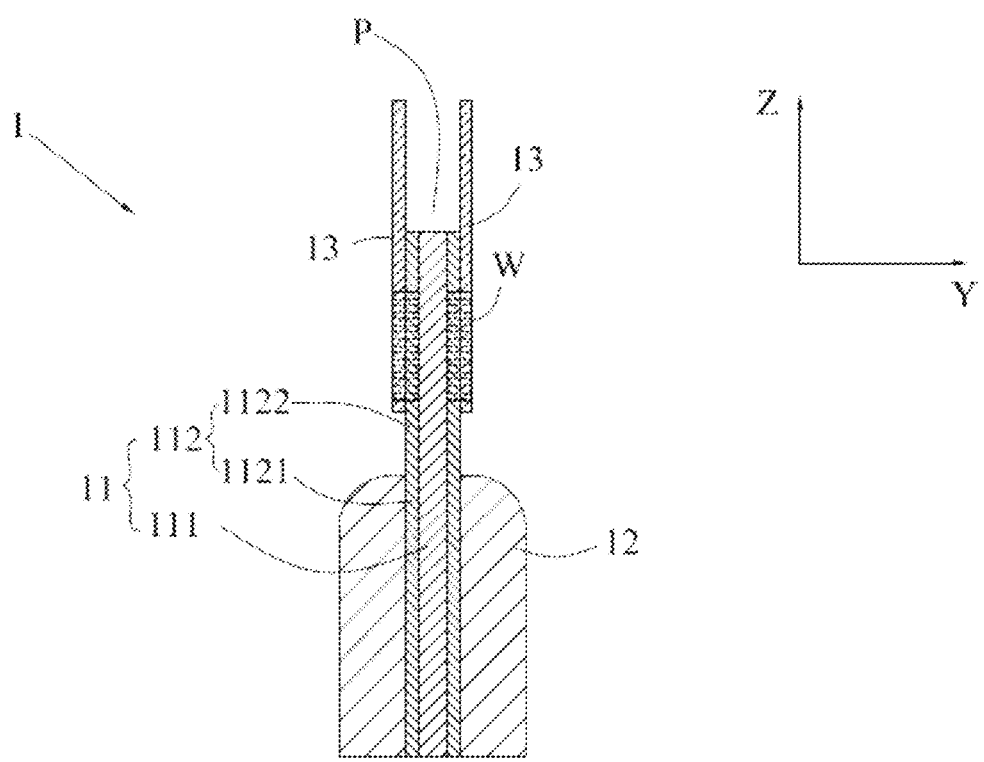
FIG. 9 is a schematic diagram of the electrode plate shown in FIG. 8, where a first protective layer is omitted.

Referring to FIG. 8, in the thickness direction Y, a surface of the first protective layer 14 facing away from the protrusion portion 1122 is lower than a surface of the active material layer 12 facing away from the main body portion 1121, i.e., the surface of the first protective layer 14 facing away from the protrusion portion 1122 is closer to the insulating layer than the surface of the active material layer 12 facing away from the main body portion 1121, so that the first protective layer 14 will not result in an increase in an overall thickness of the electrode plate 1, guaranteeing a high energy density of the secondary battery.

The first protective layer 14 can be directly disposed on the surface of the protrusion portion 1122 facing away from the insulating layer 111 to be in direct contact with the protrusion portion 1122. Alternatively, the first protective layer 14 also can be disposed on a surface of a coating, which is provided on the surface of the protrusion portion 1122 facing away from the insulating layer 111.

The first protective layer 14 has a smaller modulus of elasticity than the protrusion portion 1122. Since the first protective layer 14 is located outside of the protrusion portion 1122, after the current guiding portion P is bent, an amount of deformation of the first protective layer 14 should be larger than an amount of deformation of the protrusion portion 1122. If the first protective layer 14 has a greater modulus of elasticity than the protrusion portion 1122, the amount of deformation of the first protective layer 14 will be smaller than the amount of deformation of the protrusion portion 1122 when the current guiding portion P is bent, which may lead to a relative slide or even a detachment between the first protective layer 14 and the current guiding portion P.

In an embodiment, the first protective layer 14 is respectively connected to an end of the active material layer 12 close to the conductive structure 13 and an end of the conductive structure 13 close to the active material layer 12, so that the first protective layer 14 can be simultaneously fixed to the active material layer 12, the conductive structure 13 and the protrusion portion 1122. In this way, a bonding force of the first protective layer 14 on the electrode plate 1 can be increased, thereby preventing the first protective layer 14 from peeling off together with the protrusion portion 1122.

Figure 11:
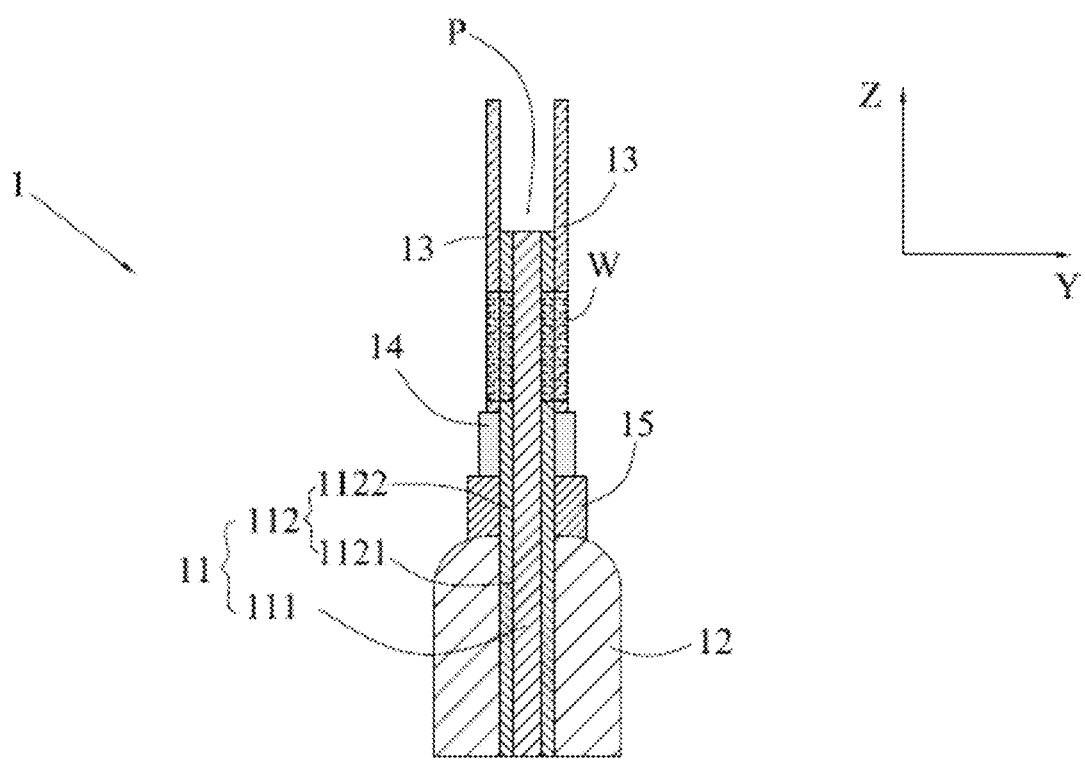
FIG. 11 is a schematic diagram of an electrode plate according to another embodiment of the present disclosure.

In another embodiment, referring to FIG. 11, the electrode plate 1 further includes a second protective layer 15 disposed between the first protective layer 14 and the active material layer 12, and the second protective layer 15 has a greater hardness than the conductive layer 112.

After the active material layer 12 is applied to the conductive layer 112, the electrode plate 1 should be rolled to make the active material layer 12 thinner, so as to increase the energy density. However, during the rolling process, the roller will exert force directly on the active material layer 12, but not on the protrusion portion 1122 since the protrusion portion 1122 of the conductive layer 113 is uncoated with the active material layer 12. Since the insulating layer 111 has a smaller modulus of elasticity than the conductive layer 112, an amount of deformation of the insulating layer 111 is larger than an amount of deformation of the conductive layer 112 under the force of the roller, which can lead to a bulge at the interface between the main body portion 1121 and the protrusion portion 1122. A deformation of bugle on the insulating layer 111 would also result in a bugle of the protrusion portion 1122, so that the protrusion portion 1122 is likely to be bent and crack, thereby degrading the current passing performance of the protrusion portion 1122. By providing the second protective layer 15, the deformation of the protrusion portion 1122 can be restricted, and thus the protrusion portion 1122 can be prevented from being broken during the rolling process and the current passing performance of the electrode plate 1 can be improved.

The second protective layer 15 has a relative great hardness and thus is unlikely to be bent, so that the current guiding portion P should be bent in the region covered by the first protective layer 14.

The second protective layer 15 is connected to the active material layer 12, and the first protective layer 14 is respectively connected to an end of the second protective layer 15 away from the active material layer 12 and an end of the conductive structure 13 close to the active material layer 12. The first protective layer 14, the second protective layer 15 and the conductive structure 13 are connected as a whole, so that a bonding force of the first protective layer 14 and the second protective layer 15 on the electrode plate 1 can be increased, thereby preventing the first protective layer 14 and the second protective layer 15 from peeling off together with the protrusion portion 1122. In addition, the second protective layer 15 is connected to the active material layer 12, so that the second protective layer 15 can cover the junction between the main body portion 1121 and the protrusion portion 1122. In this way, the protrusion portion 1122 can be protected from being broken, and the current passing performance of the electrode plate 1 can be enhanced.

Figure 12:
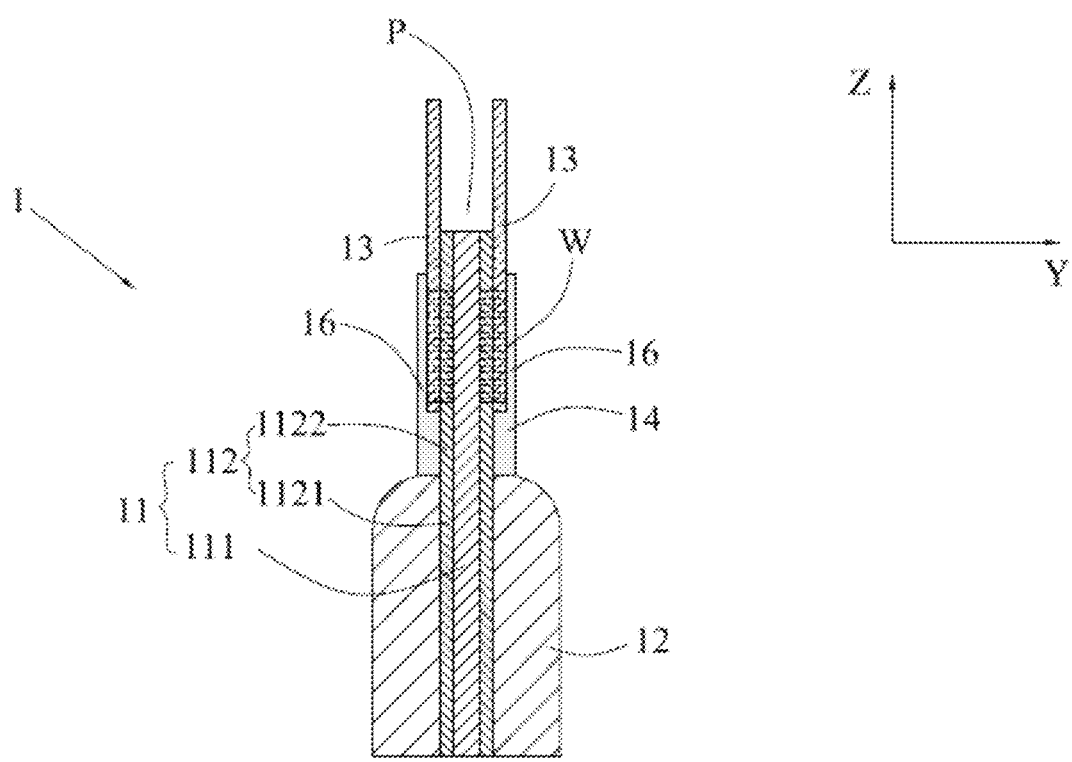
FIG. 12 is a schematic diagram of an electrode plate according to yet another embodiment of the present disclosure.

Referring to FIG. 12, the electrode plate 1 further includes a third protective layer 16 covering a surface of the welded zone W facing away from the protrusion portion 1122. The rough surface of the welded zone W facing away from the protrusion portion 1122 might pierce the separator 5, causing a short circuit. The third protective layer 16 can separate the separator 5 from the surface of the welded zone W, and prevent the separator 5 from being pierced, thereby improving the safety performance.

The third protective layer 16 is connect to the first protective layer 14, and is made of a material same as the first protective layer 14. During the forming process of the electrode plate 1, the paste can be applied to the region of the protrusion portion 1122 located between the welded zone W and the active material layer 12 as well as to a surface of the welded zone W facing away from the protrusion portion 1122, so as to form the first protective layer 14 and the third protective layer 16 that are connected with one another after curing of the paste.

Figure 7:
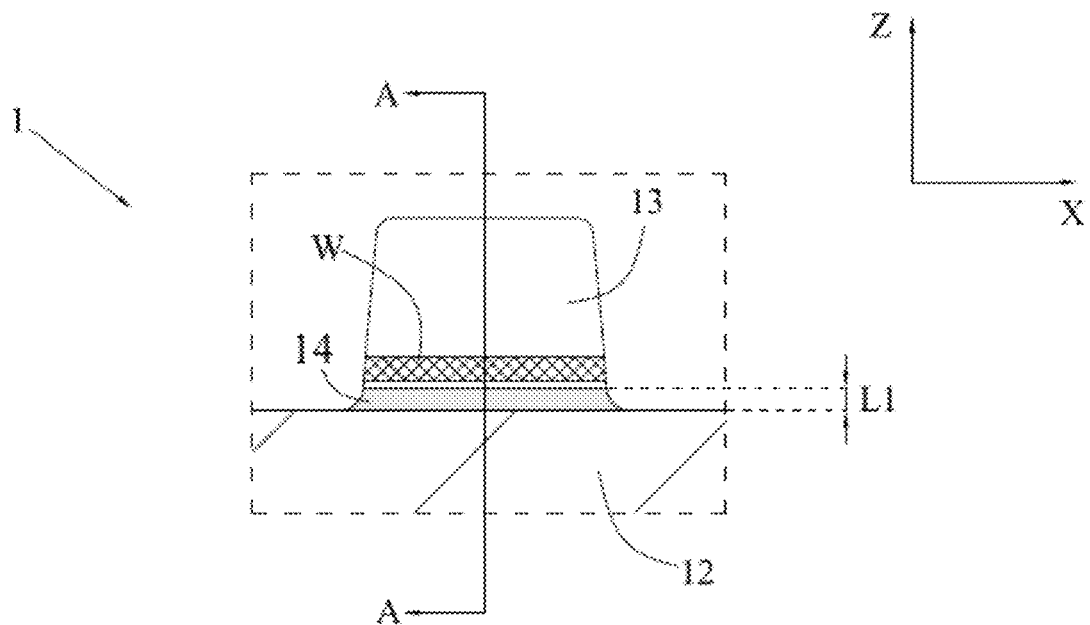
FIG. 7 is an enlarged view of the dotted frame shown in FIG. 6.

Referring to FIG. 7, the first protective layer 14 extends to edges of both sides of the protrusion portion 1122 in a length direction X, so as to maximize a coverage area of the first protective layer 14 and improve the protection effect of the first protective layer 14. The first protective layer 14 has a dimension L1 in a range of 0.1 mm to 4 mm along a height direction Z.

What is claimed is:

1. An electrode plate (1) of a secondary battery, comprising:
   a current collector (11);
   an active material layer (12);
   a conductive structure (13); and
   a first protective layer (14),
   wherein the current collector (11) comprises an insulating layer (111) and a conductive layer (112) disposed on the insulating layer (111), the conductive layer (112) includes a main body portion (1121) and a protrusion portion (1122) connected to the main body portion (1121), a surface of the main body portion (1121) facing away from the insulating layer (111) is covered by and in direct contact with the active material layer (12), and a surface of the protrusion portion (1122) facing away from the insulating layer (111) is uncovered by the active material layer (12),
   the conductive structure (13) is welded to the protrusion portion (1122) and thus a welded zone (W) is formed,
   the first protective layer (14) has elasticity, and the first protective layer (14) is disposed on and in direct contact with a side of the protrusion portion (1122) facing away from the insulating layer (111) and is located between the welded zone (W) and the active material layer (12).

2. The electrode plate (1) according to claim 1, wherein in a thickness direction (Y) of the electrode plate (1), a surface of the first protective layer (14) facing away from the protrusion portion (1122) is closer to the insulating layer (111) than a surface of the active material layer (12) facing away from the main body portion (1121).

3. The electrode plate (1) according to claim 1, wherein the first protective layer (14) is connected to an end of the active material layer (12) close to the conductive structure (13) and an end of the conductive structure (13) close to the active material layer (12).

4. The electrode plate (1) according to claim 1, wherein the first protective layer (14) is in contact with the protrusion portion (1122), and the first protective layer (14) has a smaller modulus of elasticity than the protrusion portion (1122).

5. The electrode plate (1) according to claim 1, further comprising a second protective layer (15) disposed between the first protective layer (14) and the active material layer (12), wherein the second protective layer (15) has a greater hardness than the conductive layer (112).

6. The electrode plate (1) according to claim 5, wherein the second protective layer (15) is connected to the active material layer (12), and the first protective layer (14) is connected to an end of the second protective layer (15) away from the active material layer (12) and an end of the conductive structure (13) close to the active material layer (12).

7. The electrode plate (1) according to claim 1, further comprising a third protective layer (16) covering a surface of the welded zone (W) facing away from the protrusion portion (1122), wherein the third protective layer (16) is connect to the first protective layer (14), and is made of a material same as the first protective layer (14).

8. The electrode plate (1) according to claim 1, wherein the first protective layer (14) extends to edges of both sides of the protrusion portion (1122) in a length direction (X) of the electrode plate (1), and the first protective layer (14) has a dimension (L1) in a range of 0.1 mm to 4 mm along a height direction (Z) of the electrode plate (1).

9. A secondary battery, comprising an electrode assembly, wherein the electrode assembly comprises an electrode plate (1), the electrode plate (1) comprising:
   a current collector (11);
   an active material layer (12);
   a conductive structure (13); and
   a first protective layer (14),
   wherein the current collector (11) comprises an insulating layer (111) and a conductive layer (112) disposed on the insulating layer (111), the conductive layer (112) includes a main body portion (1121) and a protrusion portion (1122) connected to the main body portion (1121), a surface of the main body portion (1121) facing away from the insulating layer (111) is covered by and in direct contact with the active material layer (12), and a surface of the protrusion portion (1122) facing away from the insulating layer (111) is uncovered by the active material layer (12),
   the conductive structure (13) is welded to the protrusion portion (1122) and thus a welded zone (W) is formed, and
   the first protective layer (14) has elasticity, and the first protective layer (14) is disposed on and in direct contact with a side of the protrusion portion (1122) facing away from the insulating layer (111) and is located between the welded zone (W) and the active material layer (12).

10. The secondary battery according to claim 9, wherein in a thickness direction (Y) of the electrode plate (1), a surface of the first protective layer (14) facing away from the protrusion portion (1122) is closer to the insulating layer (111) than a surface of the active material layer (12) facing away from the main body portion (1121).

11. The secondary battery according to claim 9, wherein the first protective layer (14) is connected to an end of the active material layer (12) close to the conductive structure (13) and an end of the conductive structure (13) close to the active material layer (12).

12. The secondary battery according to claim 9, wherein the first protective layer (14) is in contact with the protrusion portion (1122), and the first protective layer (14) has a smaller modulus of elasticity than the protrusion portion (1122).

13. The secondary battery according to claim 9, further comprising a second protective layer (15) disposed between the first protective layer (14) and the active material layer (12), wherein the second protective layer (15) has a greater hardness than the conductive layer (112).

14. The secondary battery according to claim 13, wherein the second protective layer (15) is connected to the active material layer (12), and the first protective layer (14) is connected to an end of the second protective layer (15) away from the active material layer (12) and an end of the conductive structure (13) close to the active material layer (12).

15. The secondary battery according to claim 9, further comprising a third protective layer (16) covering a surface of the welded zone (W) facing away from the protrusion portion (1122), wherein the third protective layer (16) is connect to the first protective layer (14), and is made of a material same as the first protective layer (14).

16. The secondary battery according to claim 9, wherein the first protective layer (14) extends to edges of both sides of the protrusion portion (1122) in a length direction (X) of the electrode plate (1), and the first protective layer (14) has a dimension (L1) in a range of 0.1 mm to 4 mm along a height direction (Z) of the electrode plate (1).

17. The secondary battery according to claim 9, wherein a portion of the insulating layer (111) corresponding to the protrusion portion (1122) and the protrusion portion (1122) together form a current guiding portion (P), the electrode plate (1) includes a plurality of current guiding portions (P) and a plurality of conductive structures (13), the plurality of current guiding portions (P) is stacked, and every two adjacent current guiding portions (P) of the plurality of current guiding portions (P) have a conductive structure (13) of the plurality of conductive structures (13) therebetween, and the first protective layer (14) and the protrusion portion (1122) disposed opposite to the first protective layer (14) are both bent with respect to the main body portion (1121).

\* \* \* \* \*